United States Patent
Medina et al.

(10) Patent No.: US 12,525,849 B2
(45) Date of Patent: Jan. 13, 2026

(54) EMA DROOP FUNCTION AND STOPS PROTECTION MANAGEMENT

(71) Applicant: Goodrich Actuation Systems SAS, Vernon (FR)

(72) Inventors: Raphael Medina, Pierrefitte sur Seine (FR); Karl Potier, Paris (FR)

(73) Assignee: GOODRICH ACTUATION SYSTEMS SAS, Vernon (FR)

( * ) Notice: Subject to any disclaimer, the term of this patent is extended or adjusted under 35 U.S.C. 154(b) by 149 days.

(21) Appl. No.: 18/408,847

(22) Filed: Jan. 10, 2024

(65) Prior Publication Data
US 2024/0243637 A1 Jul. 18, 2024

(30) Foreign Application Priority Data
Jan. 13, 2023 (EP) .................................. 23305047

(51) Int. Cl.
*H02K 7/12* (2006.01)
*B64C 5/10* (2006.01)
*H02K 7/116* (2006.01)

(52) U.S. Cl.
CPC .............. *H02K 7/125* (2013.01); *B64C 5/10* (2013.01); *H02K 7/116* (2013.01); *H02K 2213/06* (2013.01)

(58) Field of Classification Search
CPC ..... B64C 13/50; B64C 5/10; F16H 2035/106; F16H 35/10; H02K 2213/06; H02K 7/116; H02K 7/125
See application file for complete search history.

(56) References Cited

U.S. PATENT DOCUMENTS

| 9,038,944 B2 | 5/2015 | Senegas et al. |
|---|---|---|
| 10,035,585 B2 | 7/2018 | Schwartz |
| 2010/0213311 A1 | 8/2010 | Nguyen et al. |
| 2016/0129990 A1* | 5/2016 | Schwartz ................ B64C 13/30 244/99.2 |
| 2023/0216391 A1* | 7/2023 | Socheleau ............. F16H 49/001 310/12.04 |

(Continued)

FOREIGN PATENT DOCUMENTS

| DE | 3800647 C2 | 5/1999 |
|---|---|---|
| EP | 3018384 A1 | 5/2016 |

(Continued)

OTHER PUBLICATIONS

European Search Report for Application No. 23305047.5, mailed Jun. 14, 2023, 8 pages.

*Primary Examiner* — Naishadh N Desai
(74) *Attorney, Agent, or Firm* — CANTOR COLBURN LLP

(57) ABSTRACT

An electromechanical actuator assembly operable in a plurality of modes. The EMA assembly includes: an electrical motor having a motor shaft extending along an axis (A) of the EMA, the motor driving the shaft to rotate about the axis; a gear assembly mounted around, and in geared connection with the shaft, to rotate with the shaft; an EMA output connected to the gear assembly such that rotation of the motor shaft causes rotation of the output via the gear assembly, the output rotating at a speed which is a predetermined fraction of the speed of rotation of the motor shaft based on the gear ratio of the gear assembly.

10 Claims, 3 Drawing Sheets

(56) References Cited

U.S. PATENT DOCUMENTS

2023/0257107 A1* 8/2023 Davis ................ B64C 13/40
244/99.5

FOREIGN PATENT DOCUMENTS

| EP | 3533707 A1 | 9/2019 |
|----|------------|--------|
| EP | 3767112 A1 | 1/2021 |
| WO | 2021122587 A1 | 6/2021 |

* cited by examiner

Normal operation

Anti extension mode

EMA DROOP FUNCTION AND STOPS PROTECTION MANAGEMENT

CROSS REFERENCE TO RELATED APPLICATIONS

This application claims priority to European Patent Application No. 23/305,047.5 filed Jan. 13, 2023, the entire contents of which is incorporated herein by reference.

TECHNICAL FIELD

The present disclosure relates to an electromechanical actuator, EMA, such as for positioning moveable surfaces such as spoilers, wing flaps, etc. in aircraft and, in particular, a torque limiter device for a rotary EMA.

BACKGROUND

Actuators find many applications, particularly in controlling movement of a moveable component. In aircraft, many moveable components and surfaces are moved by means of an actuator.

Conventionally, many actuators, particularly in vehicles, aircraft, heavy machinery etc. are hydraulic actuators where components are moved in response to hydraulic or pressurized fluid. In general terms, a hydraulic actuator comprises a cylindrical housing in which is mounted an axially moveable piston rod. A free end of the piston rod that extends out of the housing is attached to a component or surface to be moved. Hydraulic fluid is provided to the actuator, from a hydraulic fluid supply in fluid communication with the interior of the actuator housing via the ports in the housing, to cause the piston rod to extend out of the housing, or hydraulic fluid is withdrawn from the housing to cause the piston rod to retract back into the housing. The movement of the piston rod is determined by the direction of, and pressure of the fluid applied to the actuator, which is in response to a control signal. As the piston rod moves relative to the housing, the moveable component or surface to which it is attached will move accordingly. To allow both extension of the rod and retraction of the rod, a valve is provided to set the movement to extension or retraction. This may be a servovalve, more specifically an electrohydraulic servovalve (EHSV).

Whilst hydraulic actuators have proven reliable and effective particularly in large load applications, the hydraulic parts of the system add considerably to the overall weight and size of the system. Also, hydraulic systems are subject to leakage and are not particularly clean.

There has, in recent years, been a move to replace hydraulic systems, in many fields, such as in aviation, with electrical or partly electrical systems which have reduced weight and footprint compared to hydraulic systems. With the move towards 'more electric aircraft' (MEE) or 'all electric aircraft' (AEE), for example, there has been a move towards using electromechanical actuators (EMA) to control the movement of movable surfaces and components.

In general, EMAs include an electric motor having an outlet shaft with first and second directions of rotation and a transmission assembly arranged to connect the shaft to the moveable surface.

One particular application for actuators (including EMAs) is in controlling movement of a spoiler on the wing of an aircraft. A spoiler is a moveable surface mounted on an aircraft wing behind the wing flap. When the aircraft is cruising, both the wing flap and the spoiler lay flat along the wing. To reduce aircraft speed, the spoiler is raised upwards relative to the wing.

The spoiler movement is caused by the actuator extending as described above in its so-called 'active mode'.

If electric power is lost when the spoiler is extended, excessive drag could be exerted by the spoiler. Systems are known, therefore, to retract the spoiler to its 'zero' position in the event of electric power loss thanks to aerodynamic loads. Usually, with hydraulic systems, this is by means of the EHSV being biased to a valve position where the high pressure fluid is provided to the chamber on the piston rod side of the piston head so that the pressure on that side of the head is greater than in the other chamber, causing the piston to retract into the housing.

Conventionally, a mechanical stop inside the housing stops the piston rod at the zero position.

Problems can also occur in spoiler control if there is a loss of hydraulic or motor power. Here a solution to prevent extension of the actuator, is an anti-extension function. It is known to locate an anti-extension device between a gearbox and a motor of the actuator, wherein when the anti-extension device is activated, the motor is protected against torque that is feeding-back through the system, e.g. resulting from loads on the flap, slat, or spoiler.

If the spoiler is extended, and pressure or power is lost, the spoiler will be retracted by aerodynamic load, and will gradually drop to become aligned with the wing surface until the zero hinge position is reached. The anti-extension function, activated on loss of power, keeps the spoiler at this position to prevent a spurious extension.

Most aircraft have a spoiler that operates using a positive stroke of the actuator rod—i.e. for extension of the rod to lift the spoiler. The stroke of the actuator is between a 'zero' position in the housing and an extended position and the control system is biased to return the rod to the zero position.

More recently, some aircraft have incorporated a 'droop' function in the spoiler, using a negative stroke of the piston rod—i.e. further back into the housing than the zero position or, put another way, a stroke moving from the zero position in the opposite direction to the direction moved in the positive stroke for extending the rod.

The droop function is used to lower the spoiler relative to the wing e.g. for high lift manoeuvres or to close a large air gap between the wing flap and the spoiler if the wing flap is extended.

A problem occurs in the area of overlap of the spoiler and the wing flap ranges of motion. If, for example, electrical power driving the spoiler is lost, the spoiler will, under its own weight or under pressure from the actuator components, press against the wing flap, thus interfering with movement of the wing flap if retraction is demanded. Because of the anti-extension function which is activated on loss of power, the spoiler cannot be extended to allow pavement of the wing flap. EMAs have, therefore, been developed that include an active mode, an anti-extension mode and a droop function to avoid the problem of the spoiler becoming stuck in the droop state on loss of power.

A torque limiter is typically provided between the anti-extension device and the transmission. The torque limiter avoids damage to the actuator and associated structure by limiting the maximum torque transmitted between the gearbox and the anti-extension device. The torque limiter can allow the output shaft to operate normally (i.e. rotate freely) even though the anti-extension device is activated (which without the bypass function of the torque limiter would cause the shaft to be prevented from rotating freely). In other words, the torque limiter may allow the surface/spoiler to be moved by an external force if the force is so large that damage to the surface, or another part of the wing or the actuator (such as the locking mechanism) may occur should the surface be held in place by the anti-extension device. The torque limiter may therefore allow the surface to be extended by the external force. If the torque experienced by the anti-extension device is at or below the predetermined level, the torque limiter will not bypass the anti-extension function.

Whilst the torque limiter addresses some of the limitations of the anti-extension mechanism, and overrides it beyond a given external force, this may still not be sufficient to ensure reliable operation in the droop zone and/or approaching the stops.

For actuators having stops and a droop function, it is desirable to have a torque limiter that is adapted to the different loads in different positions and modes of the actuator.

SUMMARY

The arrangement of the disclosure provides a torque limiter device that is adjustable depending on the EMA mode/spoiler position since different torque limits apply when the actuator is operating in the active or normal, and the anti-extension mode compared to the droop mode or close to the stops. The arrangement of the disclosure adjusts the load setting of the torque limiter accordingly.

More specifically, there is provided an electromechanical actuator, EMA, assembly operable in a plurality of modes, the EMA assembly comprising: an electrical motor having a motor shaft extending along an axis (A) of the EMA, the motor driving the shaft to rotate about the axis; a gear assembly mounted around, and in geared connection with the shaft, to rotate with the shaft; an EMA output connected to the gear assembly such that rotation of the motor shaft causes rotation of the output via the gear assembly, the output rotating at a speed which is a predetermined fraction of the speed of rotation of the motor shaft based on the gear ratio of the gear assembly; wherein the output is arranged to have a neutral position and to be rotatable away from the neutral position in a first, positive, extension direction to an extension position and away from the neutral position in a second, negative, retraction direction to a retracted position; a torque limiter having a predetermined torque limit, wherein the torque limiter is arranged to limit torque transfer between the gear assembly and the output; an anti-extension mechanism moveable between an engaged position in which it inhibits rotation of the output in the extension direction and a disengaged position wherein it allows rotation of the output in the extension direction, the anti-extension mechanism comprising a solenoid and a ratchet wheel and an anti-extension spring, wherein the anti-extension mechanism is in the disengaged position when the solenoid is energized to move the ratchet against the force of the anti-extension spring and is in the engaged position when the solenoid is not energized; wherein, in an active mode of the plurality of modes, the solenoid is energized and wherein rotation of the output shaft in either direction of rotation drives the output to rotate; wherein in an anti-extension mode, the solenoid is not energized and, when the output is at the neutral position or in the extension position, the output shaft is connected for rotation, via the ratchet, wherein the ratchet is arranged to prevent rotation of the output shaft in the extension direction of rotation; and wherein the torque limiter disengages the anti-extension mechanism in the event that the predetermined torque limit is reached; wherein in the anti-extension mode and when the output is in the retracted position, the torque limiter is adjusted to disengage the anti-extension mechanism at a torque lower than the predetermined torque limit, and/or when the output position is approaching an end stop position the torque limiter is adjusted to disengage the anti-extension mechanism at a torque lower than the predetermined torque limit.

BRIEF DESCRIPTION OF THE DRAWINGS

Preferred embodiments will now be described by way of example only and with reference to the drawings.

DETAILED DESCRIPTION

The EMA of this disclosure will be described in relation to an actuator for an aircraft and, in particular, for controlling movement of a spoiler on an aircraft wing. It should be noted, however, that other applications can be envisaged for the EMA of this disclosure, that fall within the scope of the claims, and the description is by way of example only.

Figure 1:
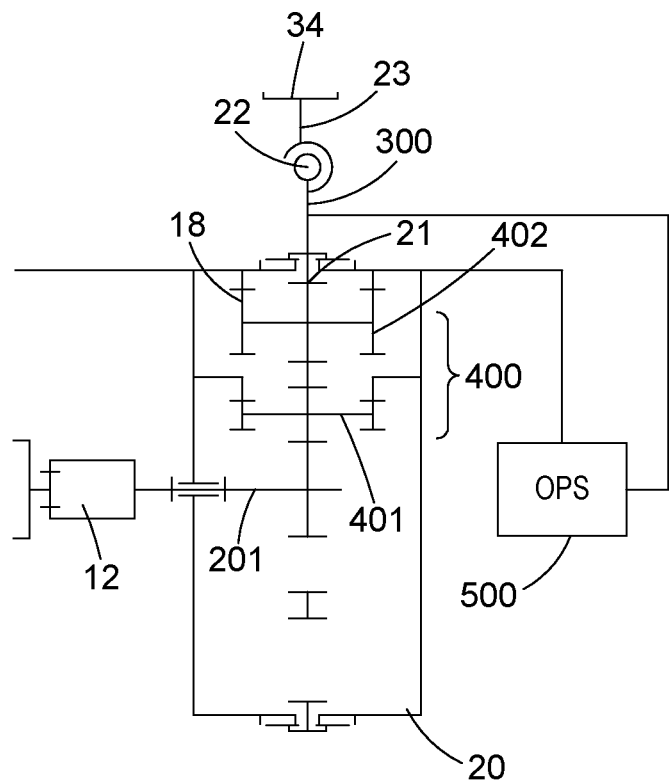
FIG. 1 is a schematic view of a known design of EMA for a spoiler, the EMA having an anti-extension device.

FIG. 1 shows, schematically, a known design of electromechanical actuator (EMA) 10. The operation of such an EMA is known in the art, but will be described briefly below.

The EMA 10 comprises a motor 12 that is connected to drive a lever 22 which, in turn, is connected to a surface e.g. a spoiler 34, to be moved, via a gear box 18 having a two-stage gear assembly 400. The motor drives the first stage 401 of the gear assembly via a rotating motor shaft 201 that extends through a housing 20 of the gear box 18, which houses the gear assembly 400 The motor shaft 201 is rotated by the motor 12 about motor axis X. This, in turn, rotates the first gear stage 401, which rotates the second gear stage 402, about axis X. The second gear stage 402 is connected to an output shaft 300 that is caused to rotate at a rate proportional to the rate of rotation of the motor shaft, the proportional relationship set by the gear ratio. Rotation of the output shaft 300 causes corresponding linear movement of the lever 22 which moves the surface (e.g. spoiler 34) accordingly. The housing 20 (and the EMA 10 as a whole) may be connected to an airframe (not shown).

The EMA is configured for electrical connection with an electrical control unit, ECU, (not shown). The ECU can be any suitable type.

An output position sensor (OPS) 500 may also be provided to provide an indication of the lever position to the ECU.

Figure 2:
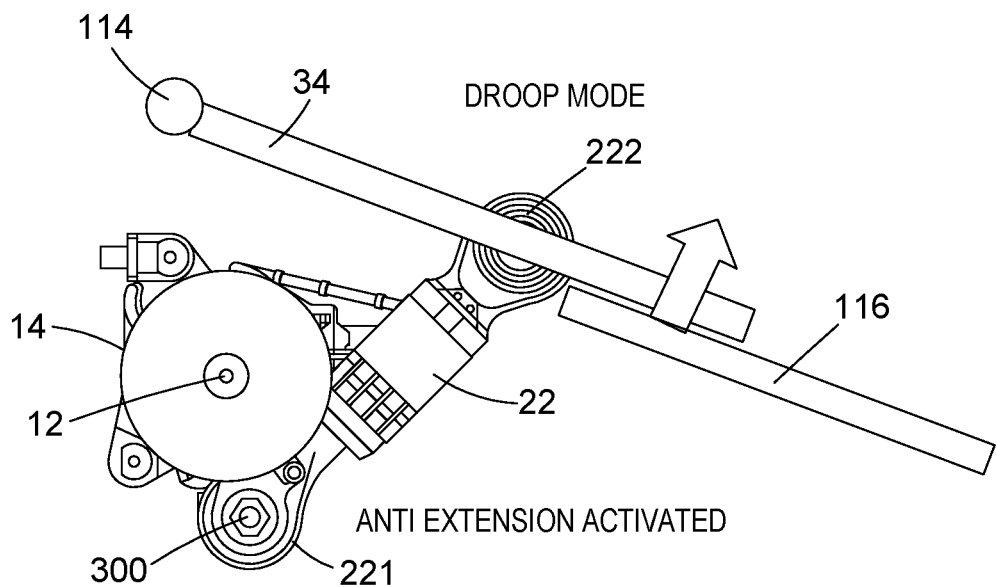
FIG. 2 shows a cross-section of the known EMA in the droop mode.

FIG. 2 shows the EMA described above, in context. The motor 12 rotates about the motor axis A causing rotation of the gears (not shown in FIG. 2). The crown 14 of an anti-extension mechanism (described further below) is shown around the gear assembly. The rotating shaft 300 causes movement of the lever 22 (also known as the actuator rod 22). One end 221 of the lever 22 is connected to the rotating shaft 300. The opposite end 222 of the lever is attached to the part to be moved-here a spoiler 34. In this example, a spoiler 34 is shown attached, at one end, to a wing part 114 of an aircraft and is shown relative to a wing flap 116.

FIG. 2 shows the spoiler and EMA in droop mode, i.e. where the actuator operates in negative stroke to move the spoiler in the negative direction relative to the neutral position such that the spoiler rests on the wing flap 116.

As mentioned above, EMAs typically include an anti-extension device which is activated in response to loss of power to the EMA/motor. When the anti-extension device is activated, it acts to prevent the actuator rod moving in the extension direction so as to avoid unnecessary extension of the surface/spoiler.

In the positive direction, the anti-extension device, when activated, will prevent movement of the surface/spoiler in the positive (i.e. upwards relative to the neutral or zero position) direction. In the event of loss of power, the spoiler (in this example) is no longer being moved upwards or in the extension direction by the EMA and will, therefore, return to its neutral or zero position. In the absence of the anti-extension device, however, the spoiler could still lift or extend due to external/aerodynamic forces and such spurious extension is undesired. The position of the actuator when the air loads are equal is also known as a zero hinge position and this is not the same as the actuator neutral position.

In the droop mode, i.e. when the actuator rod moves in negative stroke relative to the zero position, in normal operation, the spoiler is drawn downwards towards the flap 116. If power to the EMA is lost, causing, as mentioned above, the anti-extension device to be activated, the spoiler that is in the droop position will be unable to extend—i.e. move away from the flap towards the neutral position and will remain resting on the flap. If the flap was extended when the spoiler switched to anti-extension mode, the pilot will not be able to retract the flap due to the presence of the spoiler and the load of the flap, trying to retract, on the spoiler can damage the flap/spoiler.

Thus, if the actuator is above the zero hinge position when switched from active to anti-extension mode, the actuator, due to air loads, will move downwards until it reaches the actuator zero hinge position. If the actuator is below the zero hinge position when switched from active to anti-extension mode, the actuator will stay at the below zero hinge position. It is being pulled upwards by air loads but prevented from lifting by the anti-extension device. Aircraft lift, in this case, would be increased compared to an actuator without an anti-extension device in which the actuator would extend up to the zero hinge position.

Another problem that may occur with the activation of the anti-extension device, in any mode, is that external forces acting on the parts may be extremely high and may cause damage to the EMA which is trying to prevent extension of the spoiler/surface, but the external force is acting against, and is stronger than the anti-extension device. Torque limiters are known that override the anti-extension device in the event that an external force exceeds a predetermined level. The torque limiter than acts to prevent all of the external force passing through the EMA components.

Still referring to FIG. 1, the functional parts of the EMA will now be described in more detail.

The EMA includes an electrical motor 12 with an output shaft 201 that extends along the EMA axis X and which drives a rotary output 300 via a gear assembly 400. The motor is controlled by means of a command from the ECU. The gear assembly 400 is configured with a gear ratio to cause the rotary output 300 to rotate at speed which is a predefined fraction of the rotational speed of the motor shaft 201. The rotary output 300 is arranged to be connected to the lever 22 to move the surface/part according to the command. This is the normal, active mode of operation.

The EMA also includes components necessary to operate the EMA in the anti-extension mode and the maintenance and to provide the droop function. These modes and functions, and the component parts, will be described further below.

The gear system 400 includes a first gear stage 401 mounted around the motor shaft 201. Rotation of the motor shaft rotates the first gear stage. A second gear stage 402 is mounted around the first gear stage and is in toothed or meshing engagement therewith such that rotation of the first gear stage causes rotation of the second gear stage but at a lower rotational speed according to the gear ratio. The second gear stage 402 is engaged with the rotary output 300 to cause corresponding rotation thereof which, in turn, causes rotation of the lever 22. The gear system therefore has compound gear kinematics.

When the EMA is operating in active mode, the motor shaft rotates freely on rotation of the motor, causing rotation of the gear assembly 400 and, thus, the rotary output 300.

The EMA of the disclosure is further designed to operate in an anti-extension mode, to prevent the actuator extending in the positive direction from the zero or neutral position in the event of power failure. As mentioned above, for safety and efficiency reasons, if power fails, the actuator should be configured to return e.g. the spoiler to its neutral or flat position and should prevent inadvertent or uncommanded lifting of the spoiler to the extended position due to e.g. aerodynamic forces. In this mode, the motor shaft can rotate, and drive the output, in a first direction of rotation under drive of the motor 12, but is prevented from rotation in the opposite direction of rotation by a fixed crown 14. The crown 14 is configured such that the prohibited direction of rotation corresponds to the actuator extension direction, and so in this mode, extension is prevented. This describes the anti-extension function for positive strokes. As mentioned above, though, actuator systems have recently been developed that enable the actuator to operate with a negative stroke i.e. to actively retract further from the zero or neutral position. This so-called droop function allows, for example, an actuator controlled spoiler to move down relative to a wing body 114 to follow downward movement of a wing flap 116. Under normal active operation, the spoiler is also able to return from the droop position by an extension operation of the EMA—i.e. a positive stroke.

A problem arises though if the EMA Is operating in the anti-extension mode where it is prevented from moving in the extension direction when power is lost. As described above, if power is lost, the EMA moving the spoiler is prevented from operating in the extension direction. If, for example, the spoiler is in the droop zone to follow movement of a wing flap, and then power is lost, the wing flap will want to return to its neutral, non-extended position, but the spoiler, resting on the wing flap and so exerting a force on the flap against its movement to the neutral position, will prevent the flap from returning to neutral and the spoiler is not able to extend (i.e. move away from the flap) because of the anti-extension operation of the EMA.

Figure 3:
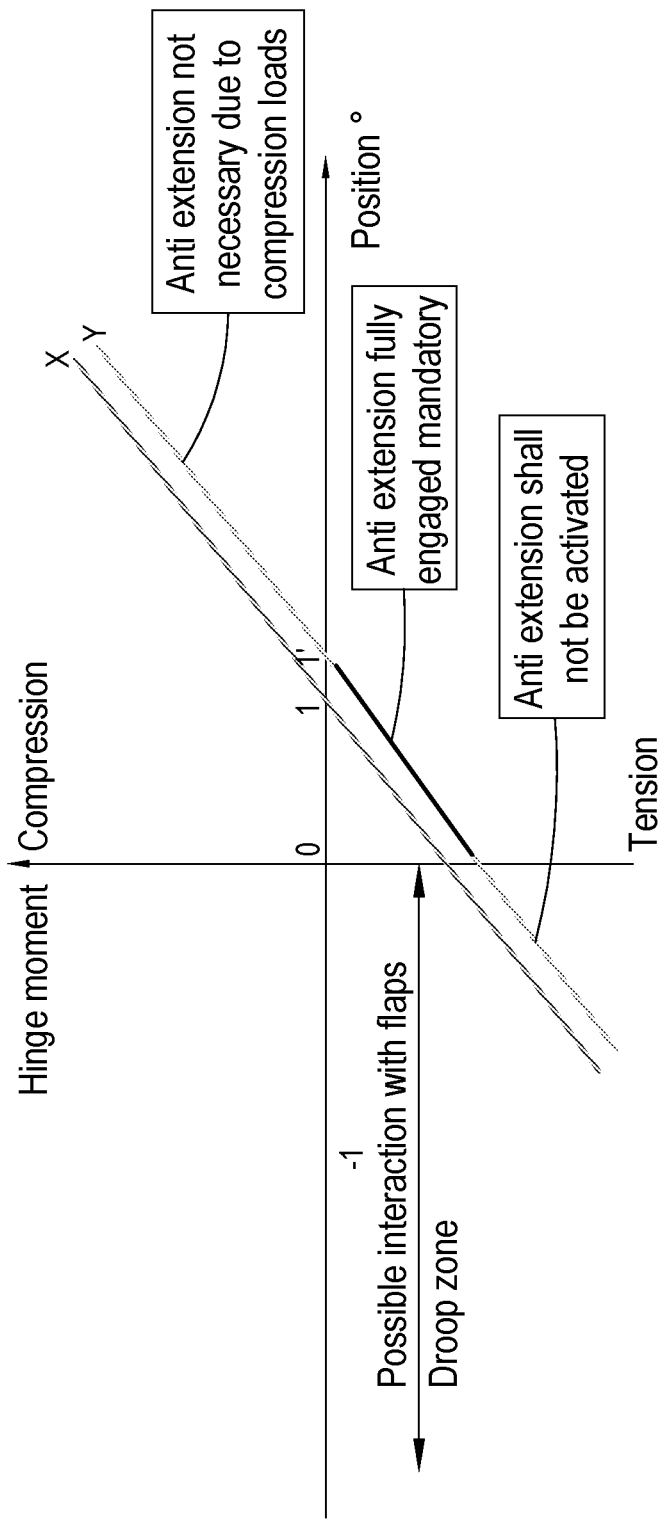
FIG. 3 is an extension plot used to describe the various degrees of extension of a spoiler.

With reference to FIG. 3, line X represents how the anti-extension device is activated, in a conventional system, when power is lost, for different positions of the spoiler about the hinge axis of extension. The x-axis shows the position of the spoiler extension relative to the zero or neutral position which is the intersection of the x-axis and the y-axis. Typically, as described above, when the anti-extension device is activated, it is activated equally for all extension positions, including the fully extended position from point 1 on the x-axis, the partially extended to neutral position between points 0 and 1 and the negative or droop position between 0 and −1. Particularly in the droop zone (the bottom left-hand quadrant of the plot), activation of the anti-extension device causes the problems mentioned above.

The present invention controls the activation of the anti-extension device depending on the extension position on the x-axis i.e. creates a relationship between the spoiler position and where the anti-extension device is activated. An example is illustrated by line Y in FIG. 3. At positions 0 to 1' on the x-axis—i.e. for normal operation in positive stroke, activation of the anti-extension device in the event of power loss is mandatory. Beyond extension position 1', the anti-extension device may be activated, and will not cause any harm. Because, however, compression loads at this extension are relatively high, anti-extension activation is not mandatory. In the droop zone (positions 0 to −1) however, according to the invention, activated of the anti-extension function is prevented—i.e. the anti-extension device is not activated when the spoiler is in droop mode/negative stroke. In this way, in the event of loss of power when in droop mode, the spoiler can be moved back towards the neutral/zero position to allow movement of the flaps.

The mechanism to allow the anti-extension function to depend on extension position will be described, by way of examples, with reference to FIGS. 4A, 4B and 5.

Figure 4A:
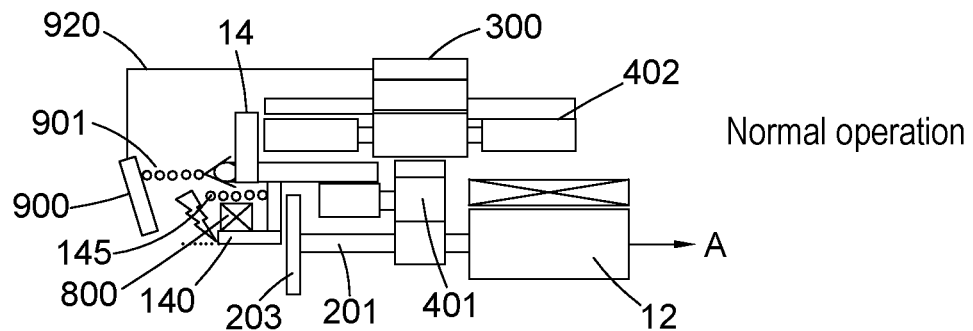
FIG. 4A shows a cross-section of a new design of EMA for a spoiler during normal operation.

FIG. 4A shows an arrangement according to the disclosure during normal operation.

As described above, a motor 12 rotates the motor shaft 201 which causes rotation of the first gear stage 401, the second gear stage 402, and the output shaft 300. The anti-extension device includes a fixed crown 14, fixed relative to the housing 20, with a ratchet wheel 140 configured to move along the fixed crown in the motor axis A direction against the force of an anti-extension device spring 145 responsive to power from an anti-extension device solenoid 800. In normal, active mode, the solenoid 800 of the anti-extension device is activated because power is being supplied. This pulls the ratchet wheel 140 against the force of the anti-extension device spring 145 away from engagement with the end 203 of the motor shaft 201, and causing compression of the anti-extension device spring 145. Thus, rotation of the motor shaft by the motor results in free rotation of the gear stages and thus free rotation of the output shaft which results in free extension/retraction of the actuator rod.

In this embodiment, the torque limiter described above will be readily recognised to those skilled in the art as a ball detent torque limiter. It should, however, be understood that any other suitable torque limiters may be used within the scope of this disclosure, for example, a shear pin torque limiter, a synchronous magnetic torque limiter, or a friction disk and spring torque limiter.

Figure 4B:
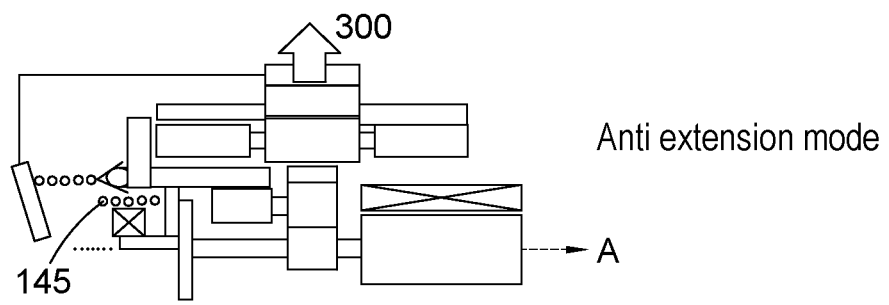
FIG. 4B shows a cross-section of the EMA of FIG. 4A in the anti-extension mode.

FIG. 4B shows the operation of the EMA in anti-extension mode—i.e. when power has been lost. When power is lost, the solenoid 800 is not energised and so the anti-extension device spring 145 relaxes/expands pushing the ratchet wheel along the crown 14 in the axial A direction towards and into engagement with the end 203 of the motor shaft. In this state, rotation of the motor shaft 201 is transmitted through the crown 14 preventing the gears from freely rotating in the extension direction.

In this configuration it is important to point out that the ratchet wheel only prohibits rotation in an extension direction of the flight control surface, and not in the reverse direction. Therefore, in an anti-extension mode the flight control surface is still permitted to be retracted (using the actuator 100) to a lower or stowed position, as anti-clockwise rotation of the ratchet wheel will merely cause the ratchet to skip along the teeth of the ratchet wheel.

Whilst the anti-extension function is important for safety reasons, as discussed above, there are conditions, e.g. when high torque is applied from external forces, in the droop mode and/or when approaching the mechanical stops, that the anti-extension function is undesirable.

To address this, the present invention incorporates a torque limiter 900 into the EMA to control the engagement of the crown 14. The torque limiter will act to disable the anti-extension device (shown enabled in FIG. 4B) in the event of excessive torque from external forces, but also in dependence on the output position of the EMA.

In anti-extension mode, the torque limiter 900 serves to disconnect the ratchet wheel from the output shaft 300, should the crown experience a torque force, in the direction of rotation that is opposed by the ratchet wheel that is above a predetermined limit. Such a force may occur due to the output shaft being urged in that direction by an external load trying to lift (or deploy) the flight control surface. Such a load may damage the EMA or other actuator/flight control surface components if the crown remained locked in place. When a torque greater than the predetermined limit is experienced, the tendency for the output shaft to rotate against the locked crown is great enough to compress the torque limiter spring, which disengages the ratchet wheel from the output shaft. This prevents the EMA and/or other actuator/structural components from being damaged by torque above the limit.

The torque limiter 900 includes a torque limiter spring 901 that biases the crown 14 in the motor axial A direction such that, for normal operation, the ratchet wheel 203 is spaced apart from the end 203 of the motor output shaft 201 as described above with reference to FIG. 4A and, when power is lost, the ratchet wheel moves, due to the force of the anti-extension device spring, into abutment with the end of the motor shaft (shown in and described with reference to FIG. 4B). If, however, external forces act on the output that exceed a predetermined torque limit defined by the strength of the torque limiter spring 901, in the anti-extension mode, the torque limiter will function to draw the crown axially away from the position when the ratchet wheel and the end of the motor shaft abut, against the force of, and compressing, the torque limiter spring 901. This then allows rotation of the gears to prevent damage to the system.

The torque limiter is adjusted based on the position of the output (indicated by line 920 in FIGS. 4A and 4B). Specifically, and as described further below, when the output position indicates that the spoiler/surface is in the droop zone i.e. the EMA is in negative stroke, the force of the torque limiter spring 901 acting in the anti-extension mode (FIG. 4B) will be removed. This results in some of the torque being imparted through the crown 14 and therefore prevents all of the torque being imparted through the gears and therefore allows the gears to rotate. Similarly, the output position sensing feature may provide information as to when the actuator is approaching the mechanical stops (not shown) whether in droop or normal mode. Again, at these positions, there may be a desire to avoid all of the torque passing through the gears and so the effect of the torque limiter spring 901 can be removed to impart some of the torque through the crown 14.

In the preferred embodiment, the torque limiter is configured such that it does not trigger at all in the active mode. In the event of operating in the anti-extension mode but in the normal range of positive stroke (between positions 0 and 1' in FIG. 3), the anti-extension device is activated and the torque limiter reacts only to excessive torque beyond the predetermined torque limit. When the output position indicates that the spoiler/surface is in a droop position, the torque limiter will be adjusted to a 'soft' level i.e. to essentially release or disable the anti-extension device, or at least set the torque limiter to kick in at a torque that is lower than the predetermined torque limit, such that relatively small torque levels will cause the torque limiter to disable the anti-extension device so that the torque passes through the crown and the gears can freely rotate. In addition, in embodiments, when the output position indicates that the actuator is reaching an end stop, the torque limiter can be completely released to protect the EMA.

Figure 5:
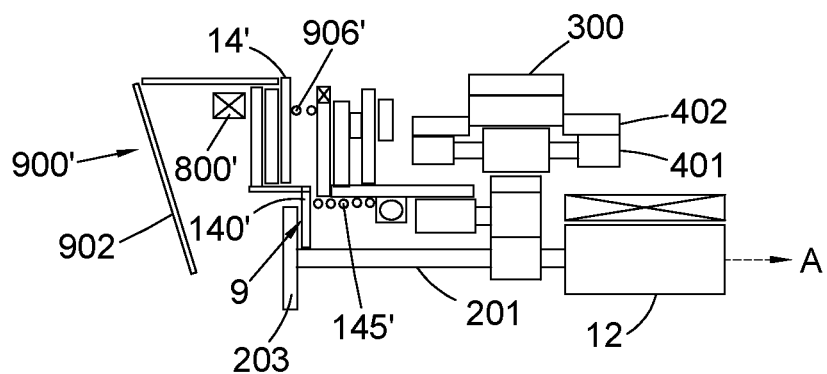
FIG. 5 is an example of a modified EMA according to the disclosure.

FIG. 5 shows one example of a torque limiter that is adjustable based on the output position of the EMA. In this example, the ratchet wheel 140' is located behind (axially towards the motor) the end 203 of the motor shaft 201 and the anti-extension device spring 145' is located inwards of the ratchet wheel, with respect to the motor axis A. In normal operation, the solenoid 800' is energised and pushes the ratchet wheel 140' against the force of the anti-extension device spring 145', compressing the spring, and holding the ratchet wheel spaced from the end 203 of the motor shaft. In the anti-extension mode, the solenoid 800' is not energised, the anti-extension device spring 145' relaxes/extends, and forces the ratchet wheel into engagement with the end of the motor shaft such that rotation of the motor shaft does not cause rotation of the gears and the output in the extension direction. The activation of the anti-extension device is, however, regulated and adjusted by the torque limiter which, in turn, is adjusted based on the EMA output position.

In the example shown, the torque limiter 900' includes an external member 902' formed with a cam profile, which is connected to the output shaft to provide an indication of the position of the output mentioned above. The torque limiter also includes a torque limiter spring 905' which is attached to the crown 14'. As the output shaft 300 rotates it causes rotation of the cam profile of the member 902' and depending on the shape of the cam and the degree of rotation of the output shaft 300, which in turn is indicative of the rotary position of the output shaft and hence the degree and direction of extension, the force exerted on the torque limiter spring 905' differs causing a different degree of compression of the cam spring according to the output position. The cam profile is selected according to the desired torque limiter function e.g. to have no anti-extension, or limited anti-extension in the droop position and/or to have no anti-extension or limited anti-extension at of close to the end stops. The degree to which the torque limiter spring is compressed determines the effect of the torque limited relative to the anti-extension device. Greater compression of the spring 905' increases the gap G between the crown 14' and the end of the motor shaft 201.

By having a torque limiter which can be configured and adjusted based on the output position, different anti-extension functions can be provided for different actuator piston and spoiler/surface positions.

Therefore, due to the operation of the torque limiter, the anti-extension features are either engaged (in the non-droop or positive stroke state) or disengaged, when in droop, based on the rotational position of the output/connecting rod.

The EMA is therefore configured to allow extension when the EMA is in droop state even if power has failed.

The invention claimed is:

1. An electromechanical actuator (EMA), assembly operable in a plurality of modes, the EMA assembly comprising:
   an electrical motor having a motor shaft extending along an axis (A) of the EMA, the motor driving the shaft to rotate about the axis;
   a gear assembly mounted around, and in geared connection with the motor shaft, to rotate with the motor shaft;
   an EMA output connected to the gear assembly such that rotation of the motor shaft causes rotation of the output via the gear assembly, the output rotating at a speed which is a predetermined fraction of the speed of rotation of the motor shaft based on the gear ratio of the gear assembly;
   wherein the EMA output is arranged to have a neutral position and to be rotatable away from the neutral position in a first, positive, extension direction to an extension position and away from the neutral position in a second, negative, retraction direction to a retracted position;
   a torque limiter having a predetermined torque limit, wherein the torque limiter is arranged to limit torque transfer between the gear assembly and the output; and
   an anti-extension mechanism moveable between an engaged position in which it inhibits rotation of the output in the extension direction and a disengaged position wherein it allows rotation of the output in the extension direction, the anti-extension mechanism comprising:
     a solenoid;
     a ratchet wheel; and
     an anti-extension spring, wherein the anti-extension mechanism is in the disengaged position when the solenoid is energized to move the ratchet wheel against the force of the anti-extension spring and is in the engaged position when the solenoid is not energized;
   wherein, in an active mode of the plurality of modes, the solenoid is energized and wherein rotation of the output shaft in either direction of rotation drives the output to rotate;
   wherein in an anti-extension mode, the solenoid is not energized and, when the output is at the neutral position or in the extension position, the output shaft is connected for rotation, via the ratchet, wherein the ratchet is arranged to prevent rotation of the output shaft in the extension direction of rotation; and wherein the torque limiter disengages the anti-extension mechanism in the event that the predetermined torque limit is reached;
   wherein in the anti-extension mode and when the output is in the retracted position, the torque limiter is adjusted to disengage the anti-extension mechanism at a torque lower than the predetermined torque limit; and
   when the output position is approaching an end stop position the torque limiter is adjusted to disengage the anti-extension mechanism at a torque lower than the predetermined torque limit.

2. The EMA assembly of claim 1, further comprising means for providing an indication of the position of rotation of the output to the torque limiter, whereby the torque limiter is adjusted based on the indicated position.

3. The EMA assembly of claim 1, wherein the torque limiter includes a torque limiter spring to bias a crown, with which the ratchet wheel engages, relative to a housing of the EMA.

4. The EMA assembly of claim 3, wherein when the output is in the retracted position, the force of the torque limiter spring is removed to allow the gears to rotate in the anti-extension mode.

5. The EMA assembly of claim 1, wherein the ratchet wheel is positioned behind, and axially towards the motor, an end of the motor shaft and the anti-extension spring is located inwards of the ratchet wheel with respect to the motor axis, A, and wherein in active mode, the solenoid is energized and pushes the ratchet wheel against the force of the anti-extension spring to space the ratchet wheel away from the end of the motor shaft and in the anti-extension mode, the solenoid is not energized and the ratchet wheel is forced into engagement with the end of the motor shaft by the bias of the anti-extension spring to prevent rotation of the gears and the output in the extension direction.

6. The EMA assembly of claim 3, wherein the torque limiter includes an external member having a cam profile, connected to the output, such that as the output rotates, it causes rotation of the torque limiter external member cam surface relative to the torque limiter spring to vary the compression of the torque limiter spring according to the rotational position of the output.

7. The EMA assembly of claim 1, further comprising:

mechanical stops defining an extent of rotation of the output in the first and second directions.

8. The EMA assembly of claim 7, wherein the torque limiter is adjusted based on detection of the rotational position of the output approaching one of the mechanical stops.

9. The EMA assembly of claim 1, wherein the output is connected to a lever for connection to a movable surface.

10. The EMA assembly of claim 9, wherein the movable surface is a spoiler of an aircraft.

* * * * *